US011468496B2

(12) United States Patent
Rakshit

(10) Patent No.: US 11,468,496 B2
(45) Date of Patent: Oct. 11, 2022

(54) SMART CONTACT LENSES BASED SHOPPING

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/987,549

(22) Filed: Aug. 7, 2020

(65) Prior Publication Data

US 2022/0044302 A1    Feb. 10, 2022

(51) Int. Cl.
| | |
|---|---|
| G06Q 30/06 | (2012.01) |
| G06Q 30/04 | (2012.01) |
| G06Q 20/14 | (2012.01) |
| G06Q 10/08 | (2012.01) |
| G06Q 20/22 | (2012.01) |
| G06F 21/35 | (2013.01) |
| G02C 11/00 | (2006.01) |
| G06Q 10/10 | (2012.01) |
| G06V 40/19 | (2022.01) |
| G02C 7/04 | (2006.01) |

(52) U.S. Cl.
CPC ......... G06Q 30/0633 (2013.01); G02C 11/10 (2013.01); G06F 21/35 (2013.01); G06Q 10/087 (2013.01); G06Q 10/10 (2013.01); G06Q 20/14 (2013.01); G06Q 20/227 (2013.01); G06Q 30/04 (2013.01); G06V 40/19 (2022.01); G02C 7/04 (2013.01)

(58) Field of Classification Search
CPC ...... G06Q 20/382; G06Q 30/06; G06Q 20/40; G06Q 30/02; G06F 3/011; G06F 3/012
USPC .............................................. 705/26.1, 14.23
See application file for complete search history.

(56) References Cited

U.S. PATENT DOCUMENTS

| | | | |
|---|---|---|---|
| 10,038,691 B2* | 7/2018 | Perna | G06Q 20/40145 |
| 10,042,994 B2* | 8/2018 | Perna | G07C 9/37 |
| 10,482,724 B2 | 11/2019 | Herring | |
| 2003/0018522 A1* | 1/2003 | Denimarck | G06Q 30/0267 705/14.53 |

(Continued)

OTHER PUBLICATIONS

Beauchamp, Daniel, "Shopify AR Makes Shopping in Augmented Reality a Reality for Small Businesses", Shopify Blog Sep. 17, 2018,<https://www.shopify.in/blog/shopify-ar>.

(Continued)

*Primary Examiner* — Olusegun Goyea
(74) *Attorney, Agent, or Firm* — Alexander G. Jochym

(57) ABSTRACT

In an approach, a processor receives a notification of entry into a store from smart contact lenses. The approach customer identification data at store entry to a program in the store server and receiving from smart contact lenses, a set of gaze data associated a customer looking at a locked product on a store shelf. The approach sending a request to unlock the product and the gaze data associated with the customer looking at the locked product to the program in the store server and receiving an indication that the locked product is unlocked. The approach includes receiving a customer identification upon the customer's store exit from smart contact lenses. The approach receiving from the program in the store server, a bill for the unlocked product.

14 Claims, 6 Drawing Sheets

(56) References Cited

U.S. PATENT DOCUMENTS

| | | | | |
|---|---|---|---|---|
| 2011/0128223 | A1* | 6/2011 | Lashina | G06F 3/012 345/158 |
| 2012/0004769 | A1 | 1/2012 | Hallenbeck | |
| 2014/0172610 | A1* | 6/2014 | Carpenter | G06Q 20/40 705/26.1 |
| 2016/0012218 | A1* | 1/2016 | Perna | G06F 16/5838 726/18 |
| 2016/0314350 | A1* | 10/2016 | Mathieu | H04N 5/23229 |
| 2018/0173949 | A1* | 6/2018 | Jeong | G06V 10/17 |
| 2018/0173951 | A1* | 6/2018 | Andorko | H04L 63/0861 |
| 2018/0240180 | A1* | 8/2018 | Glaser | G06V 20/64 |
| 2018/0322343 | A1* | 11/2018 | Perna | G06V 40/193 |
| 2019/0114488 | A1* | 4/2019 | Glazer | G07G 1/0063 |
| 2019/0251776 | A1 | 8/2019 | Adelberg | |
| 2019/0362556 | A1* | 11/2019 | Ben-Dor | G06K 7/10396 |
| 2020/0184445 | A1* | 6/2020 | Biggs | G06Q 20/3821 |
| 2021/0264908 | A1* | 8/2021 | Nagar | G10L 15/22 |
| 2021/0298868 | A1* | 9/2021 | Rydberg | A61B 90/98 |
| 2021/0305538 | A1* | 9/2021 | Ito | H01L 51/5275 |

OTHER PUBLICATIONS

Elgan, Mike, "Why a Smart Contact Lens is the Ultimate Wearable", Contributing Columnist, Computerworld, May 9, 2016, pp. 1-9, <https://www.computerworld.com/article/3066870/why-a-smart-contact-lens-is-the-ultimate-wearable.html>.

Loria, Keith, "Amazon Go stopped by technological glitches". Grocery Dive, Mar. 28, 2017, <https://www.grocerydive.com/news/grocery-amazon--go-stopped-by-technological-glitches/535290/>.

Mckay, Brett & Kay, Body Language, communication, Dating, Featured, Relationships & Family, Social Skills, "Look 'EM in the Eye: part 1—The Importance of Eye Contact", Mar. 11, 2020, <https://www.artofmanliness.com/articles/eye-contact/>.

Rademacher, Katelyn,"The Potential Problems Of Amazon Go", The futuristic Shopping Method May Come With A Variety of Issues,University of Minnesota Twin City, Dec. 12, 2016. pp. 1-4, <https://www.theodysseyonline.com/potentialproblems-of-amazon-go>.

Rakshit, Sarbajit K., "Method and System for Eye Contact Based Financial Transaction", U.S. Appl. No. 16/569,758, filed Sep. 13, 2019, 33 pages.

Rakshit, Sarbajit K., Method and System for Smart Contract Enabled Eye Contract-Based Computing, U.S. Appl. No. 16/569,793, filed Sep. 13, 2019, 35 pages.

The Guardian,"Amazon's checkout-free physical shop can't cope with more than 20 people"; Mar. 29, 2017, <https://www.theguardian.com/technology/2017/mar/29/amazon-go-checkout-free-physical-shop-delayed-camera-sensor-people>.

Walton, Chris, "Amazon Go Has Been Flawed From the Get-Go", Forbes, Aug. 3, 2018, 6 pages, <https://www.forbes.com/sites/christopherwalton/2018/08/03/in-the-era-of-alibaba-and-new-retail-amazon-go-may-have-a-fatal-flaw-that-limits-its-potential/#38dbd8a824f0 >.

Wikipedia, "Peripheral Vision", Mar. 6, 2020, pp. 1-8,<https://en.wikipedia.org/wiki/Peripheral_vision>.

\* cited by examiner

SMART CONTACT LENSES BASED SHOPPING

BACKGROUND

The present invention relates generally to the field of mobile applications, and more particularly to mobile shopping applications using smart contact lenses for in-store shopping.

Smart contact lenses are an emerging technology. Smart contact lenses are available today that correct color blindness, that seamlessly transition from light to dark environments, that correct myopia or nearsightedness, and even smart contact lenses that slow the progression of nearsightedness in children. Typically, smart contact lenses consist of a pair of soft contact lenses with a number of very thin, biocompatible electronic devices and sensors. A number of different methods to power smart contact lenses are under development including very thin batteries, solar cells, piezoelectric sensors converting mechanical power generated by blinking into electrical power, and using a connection to a wearable power source, such as a battery powered wrist band for a power source to smart contact lenses.

SUMMARY

Aspects of an embodiment of the present invention disclose a method, computer program product, and computer system include one or more processors in a computer system receiving a store entry customer identification from smart contact lenses upon store entry. The method includes one or more processors sending the store entry customer identification data to a program in the store server and receiving from smart contact lenses, a set of gaze data associated a customer looking at a locked product on a store shelf. The method includes one or more processors sending a request to unlock the product and the gaze data associated with the customer looking at the locked product to the program in the store server. The method includes one or more processors receiving an indication that the locked product is unlocked. The method includes one or more processors receiving a store exit customer identification from smart contact lenses as the customer exits the store. The method includes one or more processors receiving from the program in the store server, a bill for the unlocked product. The method includes one or more processors receiving a selection by the customer of a payment option for the unlocked product.

DETAILED DESCRIPTION

Embodiments of the present invention recognize that when shopping in a brick and mortar store, a customer wearing smart contact lenses may not want to wait in a line or a checkout queue when purchasing a product. Embodiments of the present invention recognize that when exiting the brick and mortar store, the customer may want to be select a payment option without waiting in a line for a traditional point of sale device.

Embodiments of the present invention provide a method, a computer program, and computing systems enabling a customer wearing smart contact lenses to unlock a high-end or relatively expensive product from a shelf or individual display using an application in the customer's mobile device that can wirelessly connect to both the smart contact lenses and the store server. Additionally, embodiments of the present invention provide a method, a computer application, and one or more computer systems to allow a program on the store server to track ownership of an unlocked product for customer billing. Embodiments of the present invention provide a method of transferring ownership for billing of an unlocked product from one customer to a second customer using data from smart contact lenses and the application on the customer's mobile device. Furthermore, embodiments of the present invention provide a method that allows the customer to select a payment method and provide the store server the selected payment method to purchase the unlocked product upon store exit without using traditional checkout methods by utilizing data from the smart contact lenses and data received from the application on the customer's mobile device.

Figure 1:
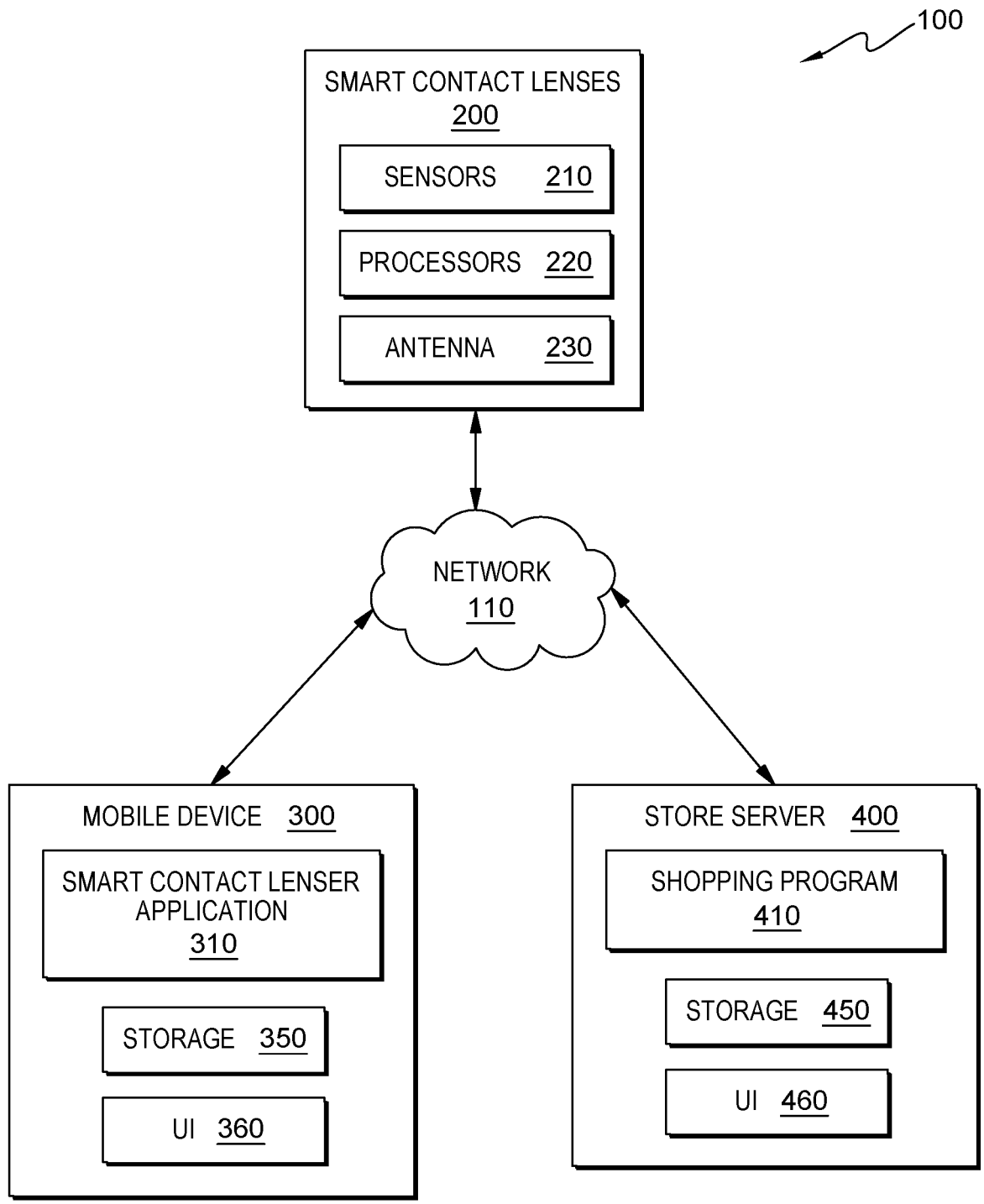
FIG. 1 depicts a functional block diagram of a computing environment suitable for operation of a smart contact lenses application in a mobile device utilizing data from smart contact lenses, in accordance with at least one embodiment of the invention.

FIG. 1 depicts a functional block diagram of a computing environment 100 suitable for operation of smart contact lenses application (SCL app.) 310 using data from smart contact lenses 200 according to an embodiment of the present invention. FIG. 1 provides only an illustration of one implementation and does not imply any limitations with regard to the environments in which different embodiments may be implemented. Implementation of embodiments of the invention may take a variety of forms, and exemplary implementation details are discussed subsequently with reference to the Figures. Many modifications to the depicted environment may be made by those skilled in the art without departing from the scope of the invention as recited by the claims.

Computing environment 100 may include smart contact lenses 200, mobile device 300, store server 400 and other computing devices (not depicted in FIG. 1) connected over network 110. Network 110 can include, for example, wireless local area network (WLAN), a telecommunications network, a local area network (LAN), a virtual LAN (VLAN), a wide area network (WAN), such as the Internet, a localized wireless communication such as a short range, low power wireless network, such as near-field communication (NFC) network, a wireless 125 kHz frequency network, such as used by vicinity card technology, or a combination of the these, where network 110 can include both wired or wireless connections. In an embodiment, computing environment 100 is a cloud computing environment. In general, the network can be any combination of connections and protocols that will support communications between store server 400, mobile device 300, smart contact lenses 200, and other computing devices (not shown) within computing environment 100.

Figure 2:
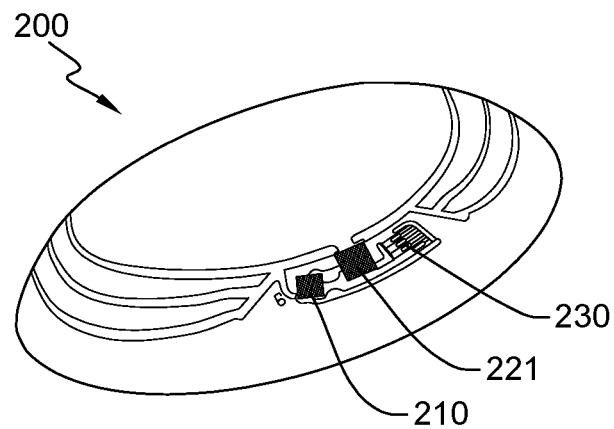
FIG. 2 is an illustration of smart contact lenses according to an embodiment of the present invention.

In various embodiments, smart contact lenses 200 are a pair of soft contact lenses inserted and worn in a customer's eye similar to conventional contact lenses (e.g., for correcting vision) but smart contact lenses 200 include a number of biocompatible electronic devices or elements. Smart contact lenses 200 may include sensors 210, processors 220 and antenna 230 but are not limited to these devices. One example of a smart contact lens of a pair of smart contact lenses 200 is depicted in FIG. 2. Smart contact lenses 200 may include embedding into the soft contact lens material very thin sensors 210, one or more biocompatible chips including processors 220, one or more antennas in antenna 230, and in some embodiments, very thin, bio-compatible batteries (not depicted). Smart contact lenses 200 can be powered by one or more of sensors 210 including piezoelectric devices or sensors utilizing mechanical power generated by blinking of the user's eyes, or solar cells as ultra-violet light sensors capable of converting energy from light into electrical energy. In other embodiments, smart contact lenses 200 are powered by ultra-thin batteries (not depicted) or by wirelessly connecting with a wearable power source on the user, such as a wrist wrap battery unit (not depicted). Smart contact lenses 200 may communicate wirelessly with mobile device 300, store server 400, and other electronic devices such as antennas, RF chips, scanners, or other electronic devices that may be present in a brick and mortar store environment. In one embodiment, smart contact lenses 200 are bionic contact lenses providing an augmented reality display. Smart contact lenses 200 may generate, send and receive data such as retinal scan data, customer identification numbers, product identification numbers, payment information, and the other data to and from mobile device 300, store server 400, and other electronic devices or readers present in the brick and mortar store environment or other computing devices not depicted in computing environment 100.

Sensors 210 may include radio frequency sensing devices, motion sensors for gaze detection, a compass chip to determine an angle or direction of a customer's gaze, solar cells for receiving or sensing light for conversion into electrical power for smart contact lenses 200, piezoelectric sensors to convert the mechanical eye movement of blinking into electrical power, range sensors capable of determining a range or gaze focal point distance, electrical sensors capable receiving electrical power from a wearable power source such as a battery powered wrist band or smart watch however, sensors 210 are not limited to these devices.

Processors 220 can be one or more very thin, biocompatible data processing elements embedded in the soft contact lenses. Processors 220 can receive and send data or commands to and from sensors 210 and antenna 230. Processors 220 may reside in one or more very thin, biocompatible chips such as chip 221 depicted in FIG. 2. Processors 220 can be included in one or more of a semiconductor based chips or processors, bioelectronic electronic devices or chips, bioelectronic chips integrating organic, carbon molecules (e.g., graphene nano-tubes), other bionanohybrid devices composed of biomolecules and other nanomaterials, or any other biocompatible electronic device capable of receiving, generating, and processing instructions or computer code instructions.

Processors 220, using antenna 230, can receive, request, or retrieve data such as retinal scan data, product identification, gaze focal point, a range to a gaze focal point, field of view determination, and other data from sensors 210 and antenna 230. The received or retrieved data from sensors 210 can be sent by processors 220 using antenna 230 to mobile device 300 over network 110. For example, antenna 230 may receive and communicate to processor 220 an indication of a radio frequency (RF) signal from a RF chip or reader located at a store entrance, in response, processor 220 queries or requests a retinal scan from sensors 210, and upon receiving the retinal scan data, processors 220 can send the retinal scan data to mobile device 300 using antenna 230. Mobile device 300 can provide the customer identification data to shopping program 410 in store server 400. In various embodiments, processors 220 may include a timing circuit to record or determine a length of a customer gaze time at a product using data from sensor 210. In an embodiment, processors 220 determine a gaze focal point range or an angular field of view with known optical focal length equations using data such as a focal length from smart contact lenses when viewing a product. In one embodiment, the received or retrieved sensor 210 data is sent to store server 400.

Antenna 230 can provide wireless communication between smart contact lenses 200 and mobile device 300, store server 400, and other electric devices such as RF chips or readers, scanners, beacons, and the like in the brick and mortar store environment. For ease of readability, hereinafter, the brick and mortar store environment will be identified as a "store." Antenna 230 utilizes network 110 to send and receive data from one or more electronic devices and computers within computer environment 100. Antenna 230 operates using any of the various wireless technologies such as short-range wireless, low power network using RF, NFC, vicinity RF (e.g., 125 kHz radio frequency communication occurring in the one meter range), Bluetooth™, or other wireless communication method. In various embodiments, antenna 230 utilizes one or more antennas such as antenna 230 depicted in FIG. 2. While depicted as a wired coil type antenna as antenna 230, antenna 230 is not limited this type of antenna structure or form.

Mobile device 300 can be a smart phone, a smart watch, a wearable computer, a tablet computing device, a computer notebook or other mobile electronic device capable of data processing and electronic communication with any of the one or more electronic or computing devices in computing environment 100. Mobile device 300 can include the capabilities and functions commonly available in smart phones such as cameras, global positioning systems (GPS), touch screens and the like. In various embodiments, mobile device 300 includes smart contact lenses (SCL) app. 310, storage 350, and user interface (UI) 360. In various embodiments, mobile device 300 receives and transmits to and from smart contact lenses 200, store server 400 and any other electronic devices not depicted in computer environment 100 using network 110.

In various embodiments, SCL app. 310 for shopping using smart contact lenses 200 receives and sends data from smart contact lenses 200 and store server 400 to facilitate a customer's in store shopping experience. Mobile application software, or an "app," is a computer program designed to run on smartphones, tablet computers and other mobile devices.

SCL app. 310 can provide data to shopping program 410 in store server 400 that may be used by shopping program 410 to unlock a high-end or relatively high value product from a shelf or display, to purchase the removed product such as a computer notebook, or transfer a purchase of the removed product to another customer. In various embodiments, SCL app. 310 is used in the store with expensive or high-end products such as smart phones, computer notebooks, art pieces, or other small but relatively expensive items when these high-end products are locked, for example magnetically, with retractable mechanical locks or small movable compartment doors on or in a display shelf.

SCL app. 310 may receive customer identification data such as retinal scan data from smart contact lenses 200 and send the customer identification (e.g., received retinal scan data) to shopping program 410 in shopping server 400. SCL app. 310 may receive gaze detection data from smart contact lenses 200 to identify a product the customer would like to remove from the display shelf. In various embodiments, SCL app. 310 receives data from sensors 210 in smart contact lenses 200 indicating that the customer has gazed at a product for a specified period of time using (e.g., using gaze detection for a customer's gaze focal point and a timing circuit in processor 220) and sends a request to shopping programs 410 for a release of a specific product from the display shelf. In response, shopping program 410 determines if the request to release the product meets a set of predefined smart contract rules allowing release of the product.

In various embodiments, SCL app. 310 responsive receiving data from smart contact lenses 200 such as a retinal scan data initiated by the store exit RF chip or reader, sends the retinal scan data to shopping program 410 in store server 400 to receive a bill or payment from shopping program 410 for any products unlocked from the store shelf or display by the customer exiting the store. In various embodiments, SCL app. 310 has the customer's various payment options embedded in SCL app. 310. Upon receipt of the billing request from shopping program 410 in store server 400, SCL app. 310 can provide, on UI 350, a display of the various payment options for selection by the customer. Responsive to receiving the customer selection of a payment option, mobile device 300 using SCL app. 310 can send the customer selected payment to store server 400. In an embodiment, SCL app. 310 is pre-set by the customer to a default payment option. In one embodiment, the payment request from store server 400 is received by SCL app. 310 and SCL app. 310 accesses one or more mobile payment applications (not depicted in FIG. 1) resident on mobile device 300 to provide a payment to store server 400.

Mobile device 300 may include storage 350. Storage 350 may store payment information, a history of products selected, for example, using a shopping cart, products returned to the store shelf using SCL app. 310, product location data, and data provided and received from store server 400 and smart contact lenses 200 such as retinal scan data and product identification. Mobile device 300 also includes user interface (UI) 360. UI 360 provides the functionality commonly provided by user interfaces in mobile phones or smart mobile devices such as display screens with touch screens. UI 360 enables a user of mobile device 300 to interact with SCL app. 310, shopping program 410, store server 400, smart contact lenses 200, and any other computing devices not shown in FIG. 1. UI 360 may receive and display data from store shopping program 410. UI 360 may receive a customer's selection of a payment method and send to shopping program 410.

In various embodiments, store server 400 is one or more computing devices or a computer system providing processing, storage, and communication needed for shopping program 410 in store server 400 and other computer processing and communication requirements of the store within computer environment 100. Store server 400 can be a laptop computer, tablet computer, netbook computer, personal computer (PC), a desktop computer, a mainframe computer, or a group of one or more computing devices requiring access to a shared resource as may occur in a cloud computing environment or other group of computers in a multi-computer environment that are managed as a single computing system. In general, store server 400 represents any programmable electronic device or combination of programmable electronic devices capable of executing machine readable program instructions and communicating with mobile device 300, smart contact lenses 200 and other electronic devices (not shown) within computing environment 100 via network 110. In various embodiments, store server 400 includes store shopping program 410, storage 450, and UI 460.

Store server 400 may include store shopping program 410. Store shopping program 410 when used in a high-end product store provides the computer instructions, programs, data storage, and communication capability to manage customer interactions within the store including customer identification, product inventory, product tracking, product billing and product payment. In various embodiments, store shopping program 410 communicates over network 110 with mobile device 300 and electronic devices such as RF chips, RF tags, scanning devices, cameras, etc. in the store (not depicted). In some embodiments, store shopping program 410 communicates with smart contact lenses 200, mobile device 300 and the other electronic devices in the store. Store shopping program 410 may receive customer identification data from mobile device 300 upon customer entry into or exit from the store. In some embodiments, store shopping program 410 receives customer identification data from smart contact lenses 200. Shopping program 410 may control and track store inventory. Store program 410 can be pre-programmed with one or more smart contract rules defining when actions such as releasing a product to a customer can occur. The smart contract rules may include one or more of the following guidelines or rules on interpreting smart contact lenses 200 data received from mobile device 300. Examples of the rules pre-set in shopping program 410 for determining actions associated with customer's using smart contact lenses 200 may include rules identifying how long a customer must look at a product to release the product, a focal point range associated with a viewed product to unlock the product, a product specific range of angular field of view to unlock the product, a duration of the unlock period for a product, a customer distance from the product, a time required for an authentication of product change of ownership or billing responsibility for a removed product, etc.

Store server 400 includes storage 450. Storage 450 may maintain records of product inventory changes, customer identification, customer accounts, customer store entry/exit, product location, product billing, payment and the like. UI 460 provides a user/computer interface using any known user interface or graphical user interface technology for communication between a user of shopping program 410 and storage 450 with mobile device 300, smart contact lenses 200 and other electronic devices (not depicted).

FIG. 2 is an illustration of smart contact lenses 200 according to an embodiment of the present invention. As depicted, FIG. 2 includes a single smart contact lens of a pair of smart contact lenses 200. The smart contact lens of smart contact lenses 200 can include sensors 210, chip 221, and antenna 231. Sensors 210 can be one or more of motion sensors, a compass chip, solar cells, piezoelectric sensors, and any other suitable smart contact lenses sensors as discussed in detail above with reference to FIG. 1.

While depicted as one chip in FIG. 2, chip 221 may be one or more very thin, biocompatible chips as discussed above in FIG. 1. Chip 221 may include processors 220. Chip 221 with processors 220 may receive, request, process instructions, and send data, such as retinal scans, to mobile device 300. In an embodiment, chip 221 with processors 220 may receive signals such as RF signals for NFC or vicinity (125 MHz RF signals) for communication with other electronic devices in the store such as product tags, product embedded RF chips, RF chips on the shelve immediately adjacent to products, RF readers or other scanning devices at the store entry and exit. In other embodiments, chip 221 with processors 220 can provide other capabilities such as a virtual display within the customer eye or field of view (e.g., an augmented reality display).

Antenna 230 can be one or more antennas for RF or other wireless communication with mobile device 300, store server 400, and other electronic devices in the store (not depicted in FIG. 1). Antenna 230 provides an ability for wireless communication over a range of frequencies. In various embodiment, antenna 230 receive and transmit over the RF frequencies utilized in NFC and 125 MHz RF frequency used in vicinity communication (e.g., approximately a 1 meter range). Antenna 230 can communicate data over one or more short range, low power wireless connections using network 110. Antenna 230 can be one or more antenna's capable of being embedded or formed in smart contact lenses 200. In one embodiment, as depicted in FIG. 2, antenna 230 is formed with micro or nano-wires embedded in smart contact lenses 200.

Figure 3:
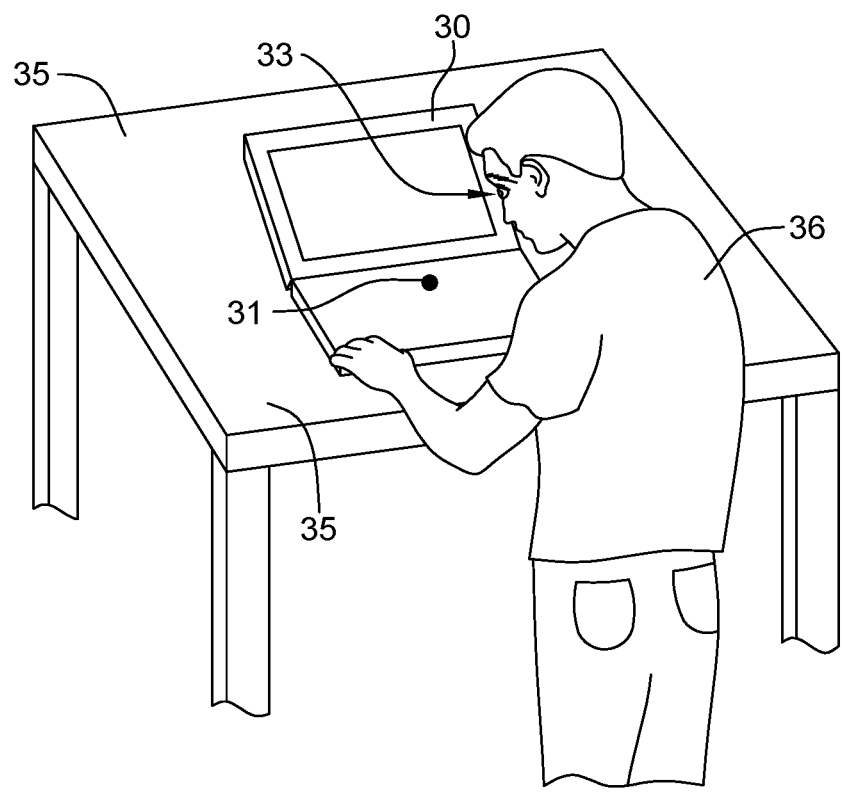
FIG. 3 is an illustration of a customer wearing smart contact lenses in a brick and mortar shopping environment to an embodiment of the present invention.

FIG. 3 is an illustration of smart contact lenses 33 in the store according to an embodiment of the present invention. As depicted, FIG. 3 includes a customer 36, a display table 35 with a magnetic lock (not depicted) holding notebook 30, embedded RF chip 31, smart contact lenses 33 in customer 36's eyes, and the customer's smart phone in the customer's pants pocket (not depicted in FIG. 2). Smart contact lenses 33 provide essentially the same functions as smart contact lenses 200 as previously discussed in detail with reference to FIG. 1. Customer 36 gazes at notebook 30. The sensors in smart contact lenses 33 may determine a gaze direction, gaze focal point, an angular field of view as the customer looks at the product, an angle of the customer gaze, a distance to notebook 30, a length of time the customer gazes at the product, and receive product information such as a product identification from an RF chip 31 in notebook 30. In some cases, the sensors in smart contact lenses 33 can read or detect information from a RF chip, RF, tag, beacon, or other electronic device adjacent to notebook 30 (e.g., embedded display table 36 adjacent to notebook 30 or in a device attached to display table 36) when RF chip 31 is not in notebook 30 or to provide a location where notebook 30 should reside.

In various embodiments, smart contact lenses 33 send RF signals to RF chip 31 or smart contact lenses 33 can detect signals emitting from embedded RF chip 31 in notebook 30 (e.g., NFC or 125 MHz RF signals). In one embodiment, embedded RF chip 31 may send a product code or a product identification to the sensors or antenna in smart contact lenses 33. Smart contact lenses 33 can send the received sensor data (e.g., retinal scan data, gaze direction, field of view range, time of gaze, product identifier) to the customer's smart phone (not depicted in FIG. 3) held in their pants pocket for transmission to shopping program 410 (not depicted in FIG. 3). As discussed later in detail with respect to FIG. 4 (step 408), if the sensor data from smart contact lenses 33 meets the conditions of the smart contact shopping rules in shopping program 410, then the magnetic lock (not depicted) on notebook 30 will be released and the customer can remove notebook 30. In an alternate embodiment, smart contact lenses 33 sends the received customer identification (e.g., retinal scan data), product data and gaze detection data (e.g., gaze time, angle, etc.) to shopping program 410 in the store server (depicted in FIG. 1) with a request to unlock notebook 30.

Figure 4:
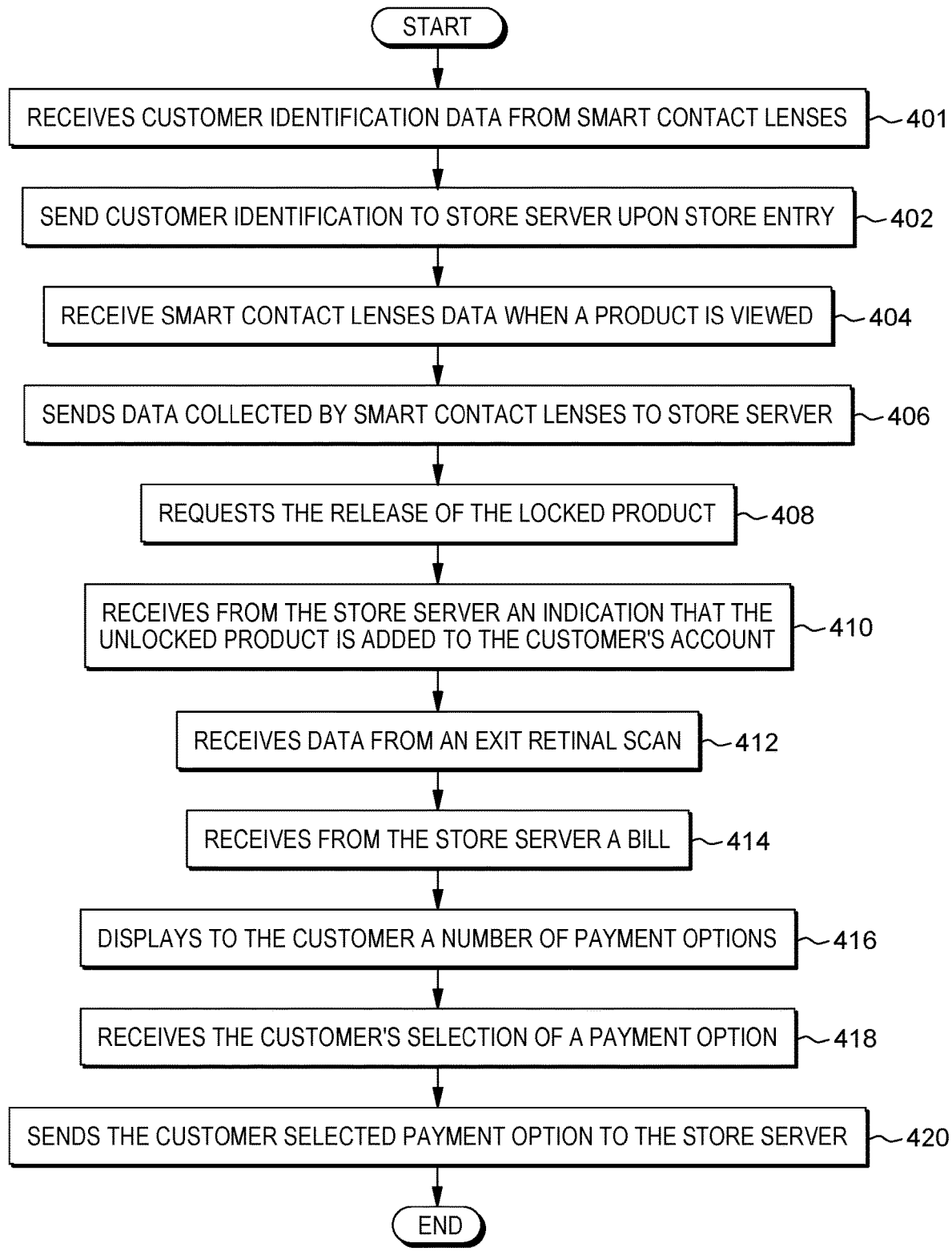
FIG. 4 is a flowchart depicting operational steps for the smart contact lenses application utilizing data from smart contact lenses in a brick and mortar store according to an embodiment of the present invention.

FIG. 4 is a flowchart depicting operational steps of smart contact lenses (SCL) app. 310 according to an embodiment of the present invention. In various embodiments, a customer in a store wearing smart contact lenses 200 and carrying mobile device 300 with SCL app. 310 shops for a high-end or high value product, such as a computing device or expensive art piece that is locked to a shelf or in a single display case. In this embodiment, the product lock can be controlled by shopping program 410 in store server 400. Shopping program 410 controls the lock on each product and is responsive to received requests, queries, and data received from SCL app. 310. For the high-end products that are locked to a store shelf or locked in an individual display by shopping program 410, a customer with smart contact lenses 200 and SCL app. 310 in mobile device 300 can select and purchase one or more of the high-end products from the store using SCL app. 310 using steps 402-420 in FIG. 4.

In step 401, SCL app. 310 receives customer identification data from smart contact lenses 200 upon store entry. A kiosk, scanner, beacon, RF antenna, or other electronic entry device is present at the store entry. As the customer enters the store, the electronic entry device or scanner can connect with antenna 230 in contact lenses 200 to initiate a retinal scan by sensors 210 in smart contact lenses 200 to identify the customer. In various embodiments, smart contact lenses 200 send the retinal scan data to SCL app. 310. In an embodiment, the electronic entry device wirelessly connects with SCL app. 310 in mobile device 300 and SCL app. 310 queries smart contact lenses 200 for the retinal scan data. In some embodiments, SCL app. 310 stores the retinal scan data in storage 350. SCL app. 310 and smart contact lenses 200 can be connected or coupled and seamlessly send and receive data to and from each other.

In step 402, SCL app. 310 sends the customer identification to shopping program 410 in the store server 400 upon store entry. SCL app. 310 provides the received or retrieved customer identification data to shopping program 410.

In step 404, SCL app. 310 receives smart contact lenses 200 data when a locked product of interest is viewed by the customer. When the customer would like to remove and/or purchase the product locked to the store shelf, the customer gazes at the locked product for a specified period of time. For example, SCL app. 310 receives data such as a FOV, a gaze direction, an angle of view, a range of FOV, a customer distance from the product, and a length of time the customer has viewed the locked product collected by sensors 210 in smart contact lenses 200. The customer's gaze data collected by sensors 210 in smart contact lenses 200 can be sent over network 110 to SCL app. 310. In an embodiments, SCL app. can 310 analyze the data received from smart contact lenses 200 using standard optical equations such as angle of view equations and use pre-programmed or pre-set limits (e.g., a limit to the amount of change in the customer's gaze direction) to determine a customer's distance from the product, angle of view, FOV, a length of time the customer views the locked product and other customer gaze related attributes.

In some embodiments, smart contact lenses 200 receives one or more of a product code, an inventory code, or other product identifier from a RF chip or tag associated with the locked product. In one example, sensors 210 or antenna 230 in smart contact lenses 200 can receive the product inventory number wirelessly transmitted from a RF chip in the locked product or in a location immediately adjacent to the locked product. The RF chip and smart contact lenses 200 may connect over network 110 using near field communication (NFC), a wavelength or frequency of a proximity communication, or a vicinity communication using a 125 mHz or higher RF frequency. In one embodiment, the RF chip associated with the locked product automatically communicates the product identifier to sensors 210 using NFC or other short-range wireless wavelength (e.g., a vicinity RF wavelength in the 125 mHz range).

In various embodiments, SCL app. 310 receives the product identifier or product inventory code from smart contact lenses 200 over network 110. In some embodiments, SCL app. 310 receives the locked product location with the product identifier. For example, sensors 210 in smart contact lenses 200 can receive a location of the identified product (e.g., in isle A or pre-programmed a GPS location pre-programmed in the RF chip) from the RF chip or other electronic device associated with the locked product on the store shelf. Smart contact lenses 200 send the location of the locked product with the locked product identifier to SCL app. 310 using antenna 230 and network 110. In an embodiment, SCL app. 310 queries a location app. in mobile device 300 for a GPS location of the locked product upon receiving the product identification from smart contact lenses 200. SCL app. 310 can store the locked product's location data in storage 350.

In step 406, SCL app. 310 sends the data collected by smart contact lenses 200 to shopping program 410 in store server 400. SCL app. 310 can send the customer identification such as the customer's retinal scan data along with data collected by smart contact lenses 200 (e.g., product identifier, the customer's FOV, the customer's gaze direction, an angle of view of the customer, a range of FOV, a customer's distance to the locked product, a length of time the customer has viewed the locked product, etc.) to shopping program 410 over network 110. In some embodiments, SCL app. 310 sends the product identifier or product inventory code collected by smart contact lenses 200 to store server 400 with the customer identification.

In step 408, SCL app. 310 requests the release of the locked product the customer has been looking at from shopping program 410 in store server 400. Based, at least in part, on the smart contact lenses 200 data received from SCL app. 310, shopping program 410, using a set of pre-programmed smart contract shopping rules, determines whether the product the customer is looking at will be unlocked. The smart contract shopping rules can be pre-set in shopping program 410 as determined by store management. The smart contract shopping rules can be used to analyze and evaluate the received smart contact lenses 200 data from SCL app. 310. For example, the smart contract shopping rules may include a required length of time the customer has viewed the product, a product specific angle of view or FOV, a distance of the customer from the product, and a length of time the product may be unlocked however, the smart contract shopping rules are not limited to these rules. When shopping program 410 in store server 400 determines that the smart contract shopping rules have been met then, shopping program 410 sends a command to the locking mechanism (e.g., a magnetic lock, a physical lock or gripper, a door of a product case, or the like) to release the locked product to the customer. In some cases, an audible alert or sound may accompany the release of the locked product. In some embodiments, shopping program 410 includes a length of time the product on the store shelf will remain unlocked. If the customer does not remove the unlocked product within the specified time, shopping program 410 re-locks the product. When shopping program 410 determines that the smart contract shopping rules have not been met then, the product remains locked until new data from SCL app. 310 allows a release of the locked product.

In step 411, SCL app. 310 receives an indication from shopping program 410 that the unlocked product is added to the customer's account in shopping program 410. The customer may pick up and examine the unlocked product. The customer may continue shopping in the store or the customer may replace the unlocked product on the store shelf. If the customer replaces the unlocked product in it's original locked location, shopping program 410 may receive an indication from one of a RF chip or the like associated with the unlocked product or from SCL app. 310 after the customer gazes upon the replaced product (e.g., to remove it from the customer's account and shopping cart).

In step 412, SCL app. 310 receives data from an exit retinal scan from smart contact lenses 200. As the customer exits the store, a kiosk, scanner, a RF chip or RF reader, or other electronic device detecting a customer exiting the store, queries or prompts smart contact lenses 200 to perform a retinal scan of the customer's eyes. In one embodiment, the kiosk, scanner, RF chip, beacon, or other electronic device detecting a customer's store exit, queries SCL app. 310 for a customer identification and SCL app. 310 retrieves one of a retinal scan from smart contact lenses 200 or from storage 350 in mobile device 300, the retinal scan from smart contact lenses 200 performed on entry into to the store. SCL app. 310 may send the retrieved retinal scan data or the exit retinal scan data from smart contact lenses 200 to shopping program 410. Shopping program 410 can use the customer's identification to locate the customer's account information. In this example, the customer has not replaced the unlocked product and would like to purchase the unlocked product.

In step 414, SCL app. 310 receives from shopping program 410 in store server 400 a bill for the unlocked product. With an indication of the customer exiting the store, shopping program 410 provides a bill with a charge for each product removed from the store shelves (i.e., each product unlocked) to SCL app. 310 in the customer's mobile device 300. In one embodiment, the customer has pre-set a default payment option with shopping program 410. In this case, the customer may leave the store without selecting a payment option.

Responsive to receiving a bill or charge for the unlocked product, in step 416, SCL app. 310 displays to the customer a number of payment options available to purchase the product. In various embodiments, SCL app. 310 is pre-programmed or pre-set with a set of payment options available to the customer such as a direct payment option (e.g., a credit card, automatic fund transfer, debit card, a mobile wallet or the like), a store account, or an equal payment monthly installment option. In another embodiment, SCL app. 310 queries one or more mobile payment applications to receive available payment options. In one case, as previously discussed, a default or pre-set payment option is configured in SCL app. 310.

In step 418, SCL app. 310 receives on UI 360 the customer's selection of a payment option. For example, the customer selects a direct payment using a mobile wallet. In one embodiment, a hands-off payment selection is received by SCL app. 310. For example, the customer may gaze at the exit kiosk or scanner to send the customer identification data directly from smart contact lenses 200 to shopping program 410 via the store exit RF chip, kiosk, or scanner. The customer, then, may gaze at mobile device 300 which has been pre-programmed with a default payment option to send to shopping program 410.

In one embodiment, the exit kiosk includes a display of some payment options available to the customer. For example, the customer account, a mobile wallet, or another mobile automatic payment option can be displayed for the customer selection using gaze detection and smart contact lenses 200. Smart contact lenses 200 collect gaze data and send the gaze data indicating the customer selected payment option to a RF chip or an antenna in the exit kiosk, or using a short range (e.g., a short wavelength) NFC or proximity communication network to shopping program 410 (e.g., using an RF chip or receiver).

In step 420, SCL app. 310 sends the customer selected payment option to shopping program 410. Using network 110, SCL app. 310 provides payment for the unlocked product and exits the store with the product. In one embodiment, SCL app. 310 includes a customer selected default payment option.

Figure 5:
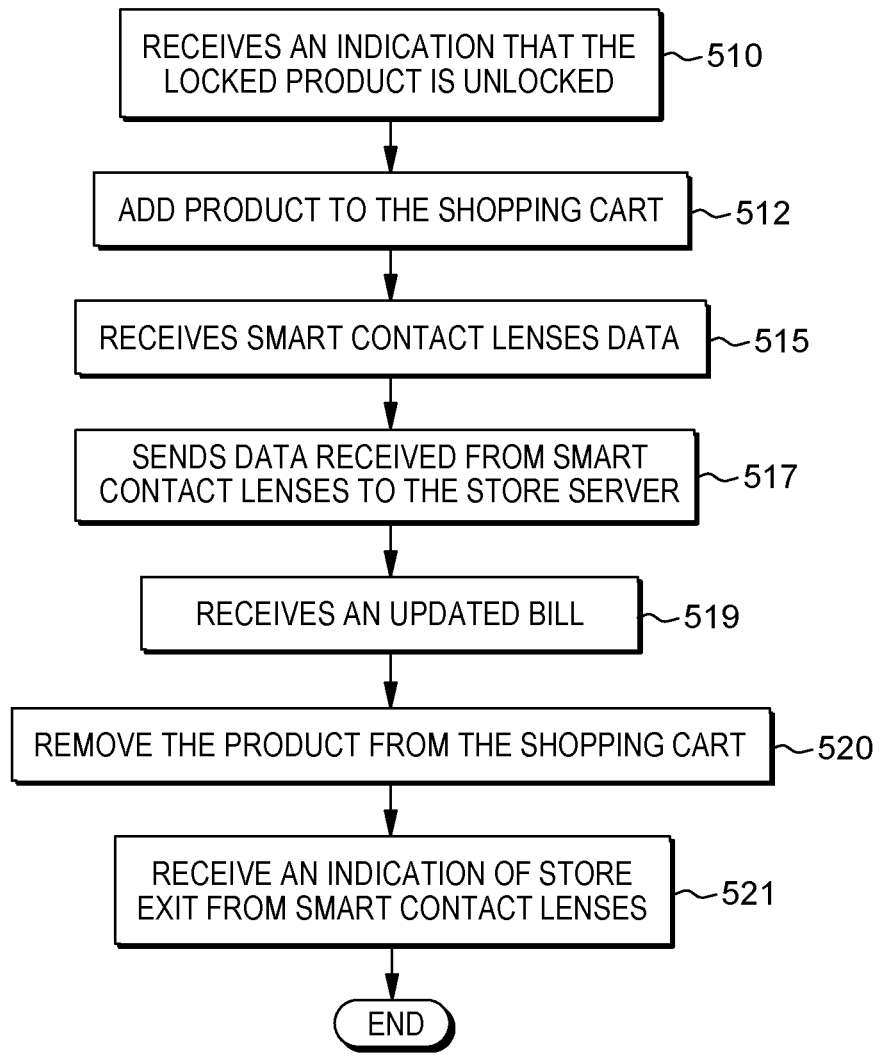
FIG. 5 is a flowchart depicting operational steps of the smart contact lenses application when a customer returns a product to a store shelf using smart contact lenses according to an embodiment of the present invention.
Figure 6:
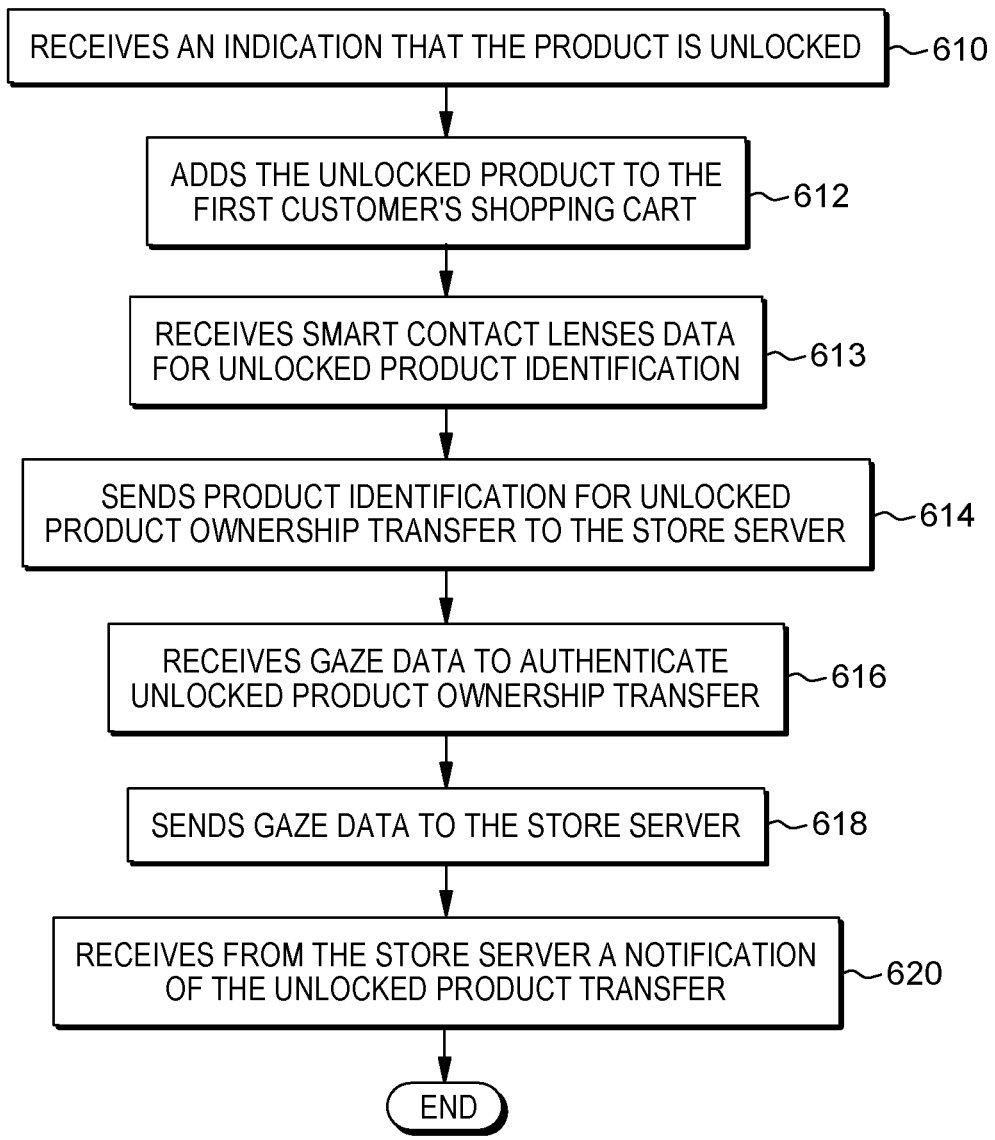
FIG. 6 is a flowchart depicting operational steps of the smart contact lenses application when a customer authenticates a transfer of a product from a first customer to a second customer using smart contact lenses according to an embodiment of the present invention.

FIG. 5 and FIG. 6 depict example flowcharts of the operational steps of SCL app. 310 in various situations that may occur while a customer is shopping in a brick and mortar store in accordance with other embodiments of the present invention. It should be noted that FIG. 5 and FIG. 6 depict merely examples of embodiments of the present invention and should not be viewed as limiting the scope of the present invention. The flowcharts of the operational steps of SCL app. 310 in both FIG. 5 and FIG. 6 occur after SCL app. 310 has provided customer identification data to shopping program 410 at the store entry and the locked product has been unlocked by shopping program 410 using the processes previously described in detail with respect to steps 402, 404, 406, and 408 in FIG. 4.

FIG. 5 is a flowchart depicting operational steps of SCL app. 310 when a customer returns an unlocked product using smart contact lenses 200 according to an embodiment of the present invention. After SCL app. 310 has provided customer identification data (e.g., retinal scan data), provided gaze detection data from smart contact lenses 200 (e.g., as discussed in steps 402-406 of FIG. 4), and obtained a release or unlock of the locked product to shopping program 410 according of processes discussed in step 408 of FIG. 4, then in step 510, SCL app. 310 receives an indication that the locked product is unlocked from shopping program 410. The indication received by SCL app. 310 can include a notification that the unlocked product is added to a bill associated with the customer as discussed in detail previously with respect to step 411 of FIG. 4.

In step 512, SCL app. 310 adds the unlocked product to the customer's shopping cart. The customer may remove the product from the store shelf and may walk around the store.

In one embodiment, when SCL app. 310 receives the indication that the product is unlocked is received from the store shelf or display, SCL app. 310 using global positioning (GPS) or another location technology utilized by mobile device 300 marks the location where the unlocked product was locked to the store shelf or display. The location data may be sent by SCL app. 310 to storage 350 in mobile device 300. In another embodiment, when smart contact lenses 200 capture a product identifier such as a product inventory code, the product identifier includes a store location (e.g., isle G or a GPS location) of the product's original locked location on the store shelf. The locked product's original shelf location and the product identifier may be sent to SCL app. 310 or retrieved by SCL app. 310. In another embodiment, shopping program 410 uses a proximity identifier on the shelf or in an adjacent area in the store such as the RF tag, RF chip or a short-range beacons signal to provide the location of the previously locked product to either or both of smart contact lenses 200 or SCL app. 310.

After examining the unlocked product, the customer decides not to purchase the product. The customer returns the product to the product's original locked position on the store shelf.

In some embodiments, SCL app. 310 retrieves from storage the location data of the product's original locked position to return the product to the product's original unlocked location on the store shelf. In other cases, the customer remembers the product's original locked position. In some cases, a label on the store shelf may identify the product's original position. The customer replaces or returns the product to its original locked location on the store shelf. After returning the unlocked product to the same position the product had when locked to the store shelf, the customer gazes at the product in the original shelf position. In this embodiment, smart contact lenses 200 collect gaze data as previously discussed.

In one embodiment, a RF chip adjacent to the product's original locked position identifies using NFC that an RF tag or chip in the product is returned to the unlocked product's original location and communicates the return of the unlocked product to the unlocked product's original location to shopping program 410.

In step 515, SCL app. 310 receives gaze data from smart contact lenses 200 when the customer gazes at the unlocked product returned to the product's original locked location on the store shelf. Smart contact lenses 200 collect the same data that the lenses collected to unlock the product in step 402 of FIG. 4 (e.g., FOV, gaze detection, angle of view, range of FOV, duration of customer gaze on the product, customer identification, etc.). In various embodiments, smart contact lenses 200 send the data collected by sensors 210 to SCL app. 310 using antenna 230 and network 110. In an embodiment, in response to receiving an indication from a near-field proximity identifier such an RF chip or tag, short-wavelength beacon, or other indication of the customer's location at the original product shelf location, SCL spp. 310 retrieves the data collected by sensors 210 in smart contact lenses 200 using network 110.

In step 517, SCL app. 310 sends the data received from smart contact lenses 200 to shopping program 410. As previously discussed in detail with respect to step 406 of FIG. 4, the data collected by smart contact lenses 200 is sent to shopping program 410 in store server 400. In some embodiments, the data collected by smart contact lenses 200 include the customer identification data. In one embodiment, SCL app. 310 retrieves customer identification data from storage 350. The identification data is sent to shopping program 410.

The smart contract shopping rules are pre-set or pre-programmed in shopping program 410 and may also contain a set of rules associated with replacing an unlocked product.

When shopping program 410 receives data (e.g., from SCL app. 310 and/or store shelf sensors or cameras) indicating the product is replaced in a same location where it was originally locked, shopping program 410 determines if the smart contract shopping rules for product return are met (e.g., length of customer gaze time, FOV, angle or view, distance to product, product location, etc.). When smart contact lenses 200 data from SCL app. 310 meets smart contract shopping rules for product return then, shopping program 410 re-locks the product on the store shelf and removes the product from the customer's bill. Shopping program 410 sends the updated bill without the returned product to SCL app. 310.

In step 519, SCL app. 310 receives from shopping program 410 the updated bill without the returned product. In step 520, SCL app. 310 removes the returned product from the shopping cart. The customer may continue shopping or exit the store.

In step 521, SCL app. 310 receives an indication from smart contact lenses 200 that the customer is leaving the store. As previously discussed in detail with respect to step 412 of FIG. 4, SCL app. 310 determines that the customer is leaving the store. In this example, the customer's shopping cart is empty. A bill is not received from shopping program 410 for the returned product since the customer successfully returned the unlocked product to the store shelf (i.e., the product is re-locked in its original position). The customer can exit the store and SCL app. 310 ends.

FIG. 6 is a flowchart depicting the operational steps of SCL app. 310 when a customer authenticates a transfer of a product to a second customer according to an embodiment of the present invention. Before FIG. 6 begins, SCL app. 310 has provided customer identification data (e.g., retinal scan data) for a first customer and a second customer wearing smart contact lenses 200. FIG. 6 begins after the first customer's smart contact lenses 200 provide gaze detection data while the first customer views the locked product (e.g., as discussed in step 406 of FIG. 4), after the first customer has sent smart contact lenses 200 data to shopping program 410 in store server 400, requested and obtained a release or unlock of the locked product from shopping program 410 according of processes discussed in step 408 of FIG. 4.

In step 610, SCL app. 310 receives an indication that the locked product is unlocked from shopping program 410. For example, shopping program 410 communicates SCL app. 310-over network 110 that the unlocked product is added to a customer account or bill associated with the first customer. In this example, the first customer is shopping with his son who is not wearing smart contact lenses 200 and the first customer's brother, who is a second customer identified to shopping program 410 by the process discussed with reference to steps 402 and 404 of FIG. 4.

In step 612, SCL app. 310 adds the unlocked product to the first customer's shopping cart. The first customer may remove the product from the store shelf. In this example, the first customer hands the unlocked product to his brother, who is the second customer wearing smart contact lenses 200 and who is identified to shopping program 410. His brother (e.g., the second customer) likes the unlocked product and would like to purchase it. The first customer agrees to releasing the product to his brother to purchase.

In step 613, SCL app. 310 receives gaze data from the first customer identifying the unlocked product to transfer ownership from smart contact lenses 200. The first customer's smart contact lenses 200 can be used with SCL app. 310 to identify the unlocked product transfer for purchase from the first customer to his brother. For example, the first customer may indicate the unlocked product to transfer by one or more of selecting the unlocked product in the shopping cart of SCL app. 310 for transfer, by gazing at a product identification such as a RF tag, a label with the product inventory, a RF chip where the unlocked product was originally located, or using NFC between smart contact lenses 200 and the product identification (e.g., embedded chip or RF tag). In the cases when the product identification can be collected by sensors 210 in smart contact lenses 200, smart contact lenses 200 can send the product identification data over network 110 using antenna 230 to SCL app. 310. In one embodiment, SCL app. 310 receives an indication such as a near-field proximity indicator or NFC signal (e.g., from an RF tag, beacon, or RF chip in the product) and in response, queries smart contact lenses 200 to receive the product identification data.

In step 614, SCL app. 310 sends the product identification data for unlocked product ownership transfer to shopping program 410 in store server 400 over network 110. In various embodiments, the product identification data received from smart contact lenses 200 and/or retrieved from the shopping cart in SCL app. 310 is sent wirelessly to shopping program 410.

In step 616, SCL app. 310 receives gaze data identifying his brother for authentication of unlocked product ownership transfer from smart contact lenses 200. In various embodiments, the first customer's smart contact lenses 200 can collect data his brother's customer identification data by gazing into his brother's eyes so that the sensors 210 in each of the first customer's smart contact lenses 200 can collect his brother's identification data (e.g., retinal scan data). In one embodiment, using antenna 230 and sensors 210 in his brother's smart contact lenses 200 use a NFC or proximity RF wavelength detection of the first customer and gaze direction, to initiate a retinal scan of the brother's eye. Smart contact lenses 200 of the first customer can receive or retrieve the brother's identification data.

In an embodiment, sensors 210 in smart contact lenses 200 in each of the first customer's and his brother's eyes can independently re-perform the customer identification such as a retinal scan. In one embodiment, SCL app. 310 of each of the first customer and his brother retrieve customer identification data or in some cases, SCL app. 310 can retrieve the first customer's stored as retinal scan data stored in storage 350 and query the second customer's SCL app. 310 for the second customer's identification data.

In various embodiments, SCL app. 310 in the first customer's eyes receives identification, such as retinal scan data, from one of his brother's smart contact lenses 200 using NFC or proximity communication of network 110 or from SCL app. 310 of his brother using network 110. For example, smart contact lenses 200 in the first customer's eyes and smart contact lenses 200 in his brother's eyes collect and send the customer identification data and the gaze data (e.g., FOV, angle of view, distance to the gaze object or the other customer, a length of time of the gaze, etc.) to each their respective SCL app. 310. Smart contact lenses 200 in each of the first customer's and his brother's eye can send the customer identification data and the gaze data to SCL app. 310 in a mobile device 300 that they own (i.e., smart contact lenses 200 in the first customer's eye send the gaze data scan to SCL app. 310 in the first customer's mobile device 300). In one embodiment, the second customer's SCL app. 310 sends the data to the first customer's SCL app. 310.

In step 618, the first customer's SCL app. 310 sends the customer identification and gaze data for the unlocked product transfer to shopping program 410 in store server 400. The customer identification data can be sent by the first customer or by both customer's to store server 400 to identify the first customer with ownership of the identified unlocked for transfer and his brother who is the second customer desiring to receive the identified unlocked product ownership. In some cases, the first customer's SCL app. 310 in the first customer's mobile device 300 and his brother's SCL app. 310 each can send the respective customer's identification data and gaze data to shopping program 410.

Shopping program 410 receives the customer identification of the current or first customer owning the identified unlocked product and using the pre-set smart contract shopping rules for product transfer evaluates the received data from the first customer and his brother. Using the received gaze data (e.g., length of time the customer's exchange a gaze, the customer distance, FOV, etc.) and the smart contract shopping rules, shopping program 410 determines whether the transfer of the identified unlocked product is authenticated. In this example, shopping program 410 using the smart contract shopping rules determines that the unlocked product transfer is authenticated, and the transfer of the identified unlocked product ownership is accomplished. In this case, shopping program 410 transfers the bill for the identified unlocked product from the first customer's account to his brother's account. In various embodiments, blockchain is utilized by shopping program 410 to track ownership of the unlocked product.

In step 620, the first customer's SCL app. 310 receives a notification from shopping program 410 that the identified unlocked product ownership has transferred to his brother. Shopping program 410 sends to the first customer's SCL app. 310 a notification that the unlocked product is removed from his account. The first customer is no longer responsible for the unlocked product and no billing for the unlocked product will be sent to the first customer. In response, SCL app. 310 removes the unlocked product from the first customer's shopping cart. Almost simultaneously, the first customer's brother SCL app. 310 receives an indication of transfer of product responsibility or ownership to him. In this case, the first customer's brother's SCL app. 310 receives an indication of addition of the unlocked product to the first customer's brother's account for billing purposes and the first customer's brother's SCL app. 310 adds the transferred unlocked product to his shopping cart.

In the event that the first customer's brother hands the unlocked product over to his son and in doing so drops the unlocked product incurring damage to the unlocked product, then in some embodiments, using blockchain, shopping program 410 tracks who damaged the unlocked product (e.g., who is responsible for the damage to the unlocked product). When the drop of the unlocked product is recorded, for example by an accelerometer in the unlocked product (e.g., a notebook computer) or by a store video camera, shopping program 410 will apply the bill to the unlocked product to the first customer's brother who now has responsibility for the unlocked product after the product transfer authentication.

In another example, the first customer's brother hands the unlocked product to his son and exits the store. In this case when no authentication of product transfer occurs then, the first customer's brother will be billed by shopping program 410 for the unlocked product. Using the processes discussed in detail with respect to steps 402-416 of FIG. 4, as the first customer's brother exits the store with or without his son, at the exit kiosk, RF chip, or scanner initiates a customer identification by SCL app. 310 using data retrieved from smart contact lenses 200 (e.g., a retinal scan or a retrieval of previous retinal scan data) that is sent to shopping program 410. Shopping program 410 sends the bill for the unlocked product to the first customer's brother SCL app. 310 and SCL app. 310 receives from the first customer's brother a selection of a payment option. SCL app. 310 sends the selected payment option to shopping program 410. SCL app. 310 ends.

Figure 7:
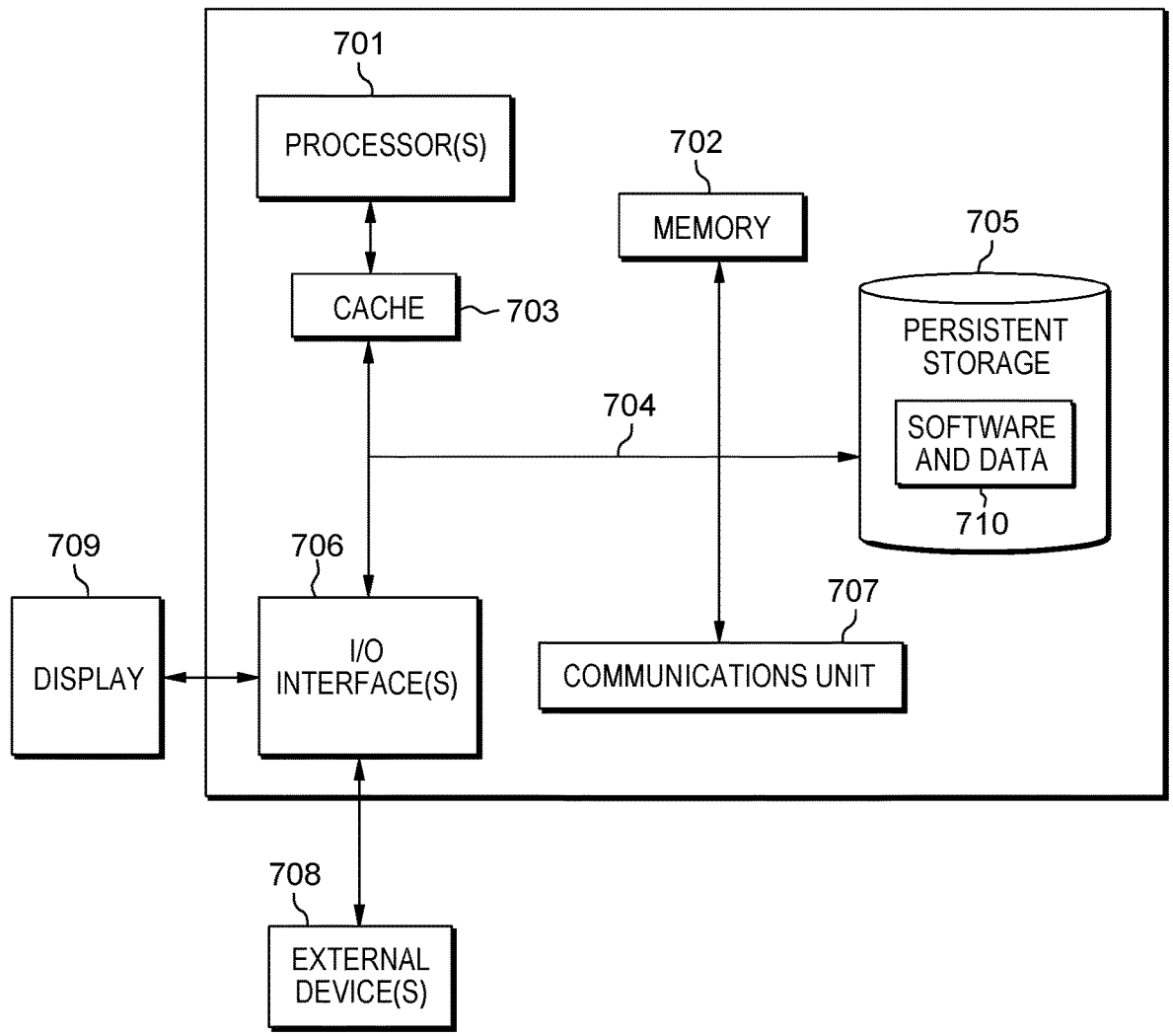
FIG. 7 is a block diagram depicting components of a computer system suitable for executing the smart contact lenses application according to an embodiment of the present invention.

FIG. 7 is a block diagram depicting components of a computer system suitable for executing SCL app. 310, in accordance with at least one embodiment of the invention. FIG. 7 depicts computer system 700, which is representative of mobile device 300, store server 400, and in various embodiments, smart contact lenses 200, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made. Computer system 700 includes processor(s) 701, cache 703, memory 702, persistent storage 705, communications unit 704, input/output (I/O) interface(s) 706, and communications unit 704. Communications unit 704 provides communications between cache 703, memory 702, persistent storage 705, communications unit 704, and input/output (I/O) interface(s) 706. Communications unit 704 can be implemented with any architecture designed for passing data and/or control information between processors (such as microprocessors, communications and network processors, etc.), system memory, peripheral devices, and any other hardware components within a system. For example, communications unit 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processor(s) 701 by holding recently accessed data, and data near recently accessed data, from memory 702.

Program instructions and data (e.g., software and data 710) used to practice embodiments of the present invention may be stored in persistent storage 705 and in memory 702 for execution by one or more of the respective processor(s) 701 via cache 703. In an embodiment, persistent storage 705 includes a magnetic hard disk drive. Alternatively, or in addition to a magnetic hard disk drive, persistent storage 705 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Software and data 710 can be stored in persistent storage 705 for access and/or execution by one or more of the respective processor(s) 701 via cache 703. With respect to mobile device 300, software and data 710 includes SCL app. 310, UI 360 and can include storage 350.

With respect to store server 400, software and data 710 includes shopping program 410, UI 460, and can include storage 460.

Communications unit 704, in these examples, provides for communications with other data processing systems or devices. In these examples, communications unit 704 includes one or more network interface cards. Communications unit 704 may provide communications through the use of either or both physical and wireless communications links. Program instructions and data (e.g., software and data 710) used to practice embodiments of the present invention may be downloaded to persistent storage 705 through communications unit 707.

I/O interface(s) 706 allows for input and output of data with other devices that may be connected to each computer system. For example, I/O interface(s) 706 may provide a connection to external device(s) 708, such as a keyboard, a keypad, a touch screen, and/or some other suitable input device. External device(s) 708 can also include portable computer readable storage media, such as, for example, thumb drives, portable optical or magnetic disks, and memory cards. Program instructions and data (e.g., software and data 710) used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more processors in a first customer's second mobile device, a store entry customer identification from smart contact lenses worn by a first customer upon entry into a store;
    sending, by the one or more processors in the first customer's second mobile device, a store entry customer identification to a program in a store server;
    receiving, by the one or more processors in the first customer's second mobile device, from the smart contact lenses worn by the first customer, a first set of gaze data associated the first customer looking at a locked product on a store shelf;
    sending, by the one or more processors in the first customer's second mobile device, to the program in the store server, a request to unlock the product identified by the first set of gaze data associated with the first customer looking at the locked product to the program in the store server;
    receiving, by the one or more processors in the first customer's second mobile device, an indication that the locked product is unlocked;
    receiving, by the one or more processors in the first customer's second mobile device, from the smart contact lenses worn by the first customer, a second set of gaze data identifying the unlocked product for transfer to a second customer;
    receiving, by the one or more processors in the first customer's second mobile device, from the smart contact lenses worn by the first customer, a third set of gaze data identifying the second customer; and
    sending, by the one or more processors in the first customer's second mobile device, to the program in the store server, a request to transfer ownership of the unlocked product from the first customer to the second customer based, at least in part, on the third set of gaze data identifying the second customer.

2. The computer-implemented method of claim 1, wherein the smart contact lenses include one or more sensors, one or more processors, and one or more antennas.

3. The computer-implemented method of claim 2, wherein the first customer's second mobile device receives at least the store entry customer identification, the first set of gaze data associated with the first customer looking at the locked product on the store shelf, the third set of gaze data identifying the second customer, and a store exit identification from the smart contact lenses worn by the first customer.

4. The computer-implemented method of claim 1, wherein sending, by the one or more processors in the first customer's second mobile device, the request to unlock the product and the first set of gaze data associated with the first customer looking at the locked product to the program in the store server includes the program in the store server determining if a set of pre-defined smart contract rules are met to unlock the product for the first customer.

5. The computer-implemented method of claim 1, wherein receiving the indication that the locked product is unlocked, further comprises:
    receiving, by the one or more processors in the first customer's second mobile device, from the program in the store server, a notification the first customer's ownership of the unlocked product and a charge to the-store account of the first customer for the unlocked product; and
    adding, by the one or more processors in the first customer's second mobile device, the unlocked product to a shopping cart.

6. The computer-implemented method of claim 1, wherein receiving the store entry customer identification from the smart contact lenses upon store entry includes receiving retinal scan data of the first customer's eye from the smart contact lenses.

7. A computer system comprising:
    one or more computer processors;
    one or more computer readable storage media; and
    program instructions stored on the one or more computer readable storage media for execution by at least one of the one or more processors, the program instructions comprising instructions to perform;
    receiving, by one or more processors in a first customer's second mobile device, a store entry customer identification from smart contact lenses worn by a first customer upon entry into a store;
    sending, by the one or more processors in the first customer's second mobile device, a store entry customer identification to a program in a store server;
    receiving, by the one or more processors in the first customer's second mobile device, from the smart contact lenses worn by the first customer, a first set of gaze data associated the first customer looking at a locked product on a store shelf;
    sending, by the one or more processors in the first customer's second mobile device, to the program in the store server, a request to unlock the product identified by and the first set of gaze data associated with the first customer looking at the locked product to the program in the store server;

receiving, by the one or more processors in the first customer's second mobile device, an indication that the locked product is unlocked;

receiving, by the one or more processors in the first customer's second mobile device, from the smart contact lenses worn by the first customer, a second set of gaze data identifying the unlocked product for transfer to a second customer;

receiving, by the one or more processors in the first customer's second mobile device, from the first customer's smart contact lens, a third set of gaze data identifying the second customer;

sending, by the one or more processors in the first customer's second mobile device, to the program in the store server, a request to transfer ownership of the unlocked product from the first customer to the second customer based, at least in part, on the third set of gaze data identifying the second customer.

8. The computer system of claim 7, wherein the smart contact lenses include one or more sensors, one or more processors, and one or more antennas.

9. The computer system of claim 7, wherein the first customer's second mobile device receives at least the store entry customer identification, the first set of gaze data associated with the customer looking at the locked product on the store shelf, the third set of gaze data identifying the second customer, and a store exit identification from the smart contact lenses worn by the first customer.

10. The computer-implemented method of claim 1, wherein receiving the indication that the locked product is unlocked further comprises receiving, by the one or more processors in the first customer's second mobile device, from the program in the store server, a notification that the unlocked product is added to the store account of the first customer.

11. The computer-implemented method of claim 10, wherein receiving, by the one or more processors in the first customer's second mobile device, from the program on the store server, a notification of an authentication of the transfer of the unlocked product ownership from the first customer to an application on the second customer's mobile device.

12. The computer-implemented method of claim 10, further comprises, receiving, by the one or more processors in the first customer's second mobile device, a notification from the program on the store server of a transfer of the unlocked product from the store account of the first customer to the store account of the second customer.

13. The computer-implemented method of claim 1, further comprises:

receiving, by one or more processors, a store exit customer identification from the smart contact lenses as the customer exits the store; and receiving, by the one or more processors in the customer's second mobile device, from the program in the store server, an updated bill without the returned unlocked product.

14. The computer-implemented method of claim 12, receiving, by the one or more processors in the first customer's second mobile device, a notification from the program on the store server of a transfer of the unlocked product from the store account of the first customer to the store account of the second customer is based, at least in part, on the second set of gaze data identifying the unlocked product and third set of gaze data identifying the second customer.

* * * * *